No. 632,337. Patented Sept. 5, 1899.
F. CLARK.
CAR WHEEL.
(Application filed June 22, 1899.)

(No Model.)

Witnesses:
John Enders Jr.
Geo. M. Copenhaver.

Inventor
Fred Clark
by W. A. Ruff
Attorney

THE NORRIS PETERS CO., PHOTO-LITHO., WASHINGTON, D. C.

UNITED STATES PATENT OFFICE.

FRED CLARK, OF WACO, TEXAS.

CAR-WHEEL.

SPECIFICATION forming part of Letters Patent No. 632,337, dated September 5, 1899.

Application filed June 22, 1899. Serial No. 721,448. (No model.)

*To all whom it may concern:*

Be it known that I, FRED CLARK, a citizen of the United States, residing at Waco, in the county of McLennan and State of Texas, have invented certain new and useful Improvements in Car-Wheels, of which the following is a specification.

This invention relates to improved means for securing tires to locomotive-wheels; and it has for its object to provide improved tire-attaching devices so constructed that the tires may be easily and quickly tightened up to compensate for expansion and elongation and to hold the tires securely in place under any amount of expansion thereof liable to occur in practice.

To these ends my invention consists in the features and in the construction, combination, and arrangement of parts hereinafter described, and particularly pointed out in the claims following the description, reference being had to the accompanying drawings, forming a part of this specification, wherein—

Figure 1:
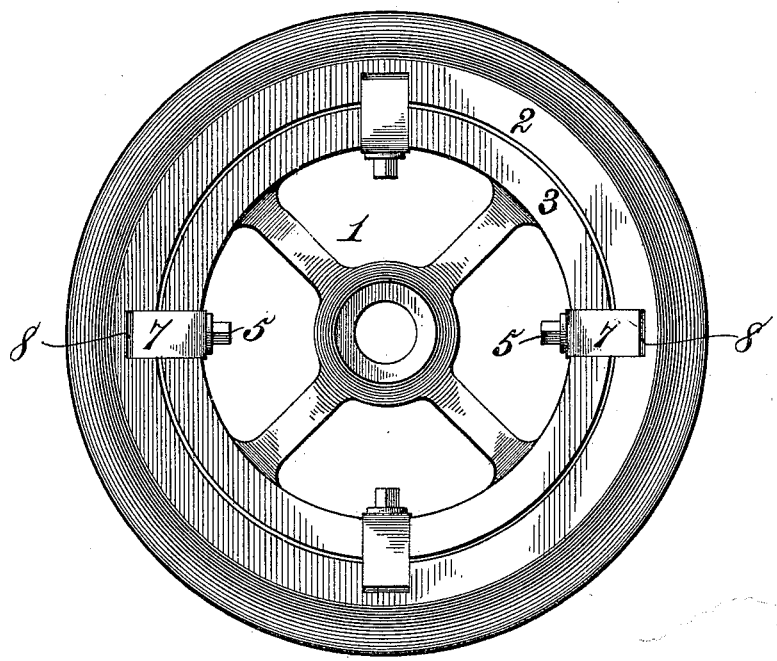
Figure 2:
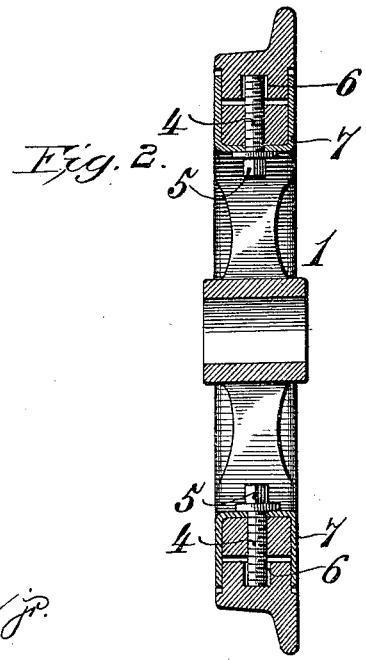

Figure 1 is a view in elevation of a locomotive-wheel embodying my invention, and Fig. 2 is a vertical transverse central section thereof.

Heretofore the tires of locomotive-wheels have been extremely apt to quickly become loose owing to expansion and elongation and to the great weight and wear they are subjected to. By means of my invention the tires may be quickly tightened and securely held in place on the wheels in the following manner.

Referring to the drawings the numeral 1 indicates a locomotive-wheel of ordinary or usual construction, and 2 the tire removably arranged thereon. Formed in the rim 3 of the wheel at suitable distances apart are threaded perforations, into and through which are screwed machine-screws 4, provided on their inner ends with square or angular heads 5, adapted to be engaged by a wrench for turning up the screws. Formed on the inner circumference of the tire opposite the outer ends of the screws 4 are slots or sockets 6, having smooth or unthreaded walls into which the ends of the screws loosely project. When the tire becomes loose through expansion, wear, or elongation, it may be instantly tightened on the wheel by screwing up or outward the screws 4. By having the ends of the screws loosely engage the slots or sockets in the tire the latter may have a certain amount of expansion (in practice at least one-half an inch) without injuring the screws and without being displaced from the wheel.

In order to effectually prevent any lateral displacement of the tire relatively to the wheel, I provide a plurality of U-shaped metallic clips 7, that embrace the rim 3 of the wheel and are secured in place by the screws 4, which pass through suitable perforations formed in said clips. The ends of the clips also embrace the opposite sides of the tire and in order that they may lie flush with said sides I form recesses 8 in the sides of the tire in which the ends of the clips are seated. In this manner the clips are prevented from projecting beyond the sides of the tire and cannot therefore strike or engage any part of the locomotive.

Having described my invention, what I claim is—

1. The combination with a locomotive-wheel, of screws screwed through the rim thereof and provided on their inner ends with heads, and a tire disposed circumferentially on the wheel and provided on its inner circumference with unthreaded slots or sockets into which the outer ends of the screws loosely project, and U-shaped clips embracing said wheel-rim and the sides of the tire and held in place by the screws, substantially as described.

2. The combination with a locomotive-wheel, of screws screwed through the rim thereof and provided on their inner ends with heads, a tire disposed circumferentially on the wheel and provided on its inner circumference with slots or sockets into which the outer ends of the screws loosely project, and U-shaped clips embracing said wheel-rim and the opposite sides of the tire, the ends of said clips being seated in recesses formed in the sides of the tire and said clips being held in place by the said screws, substantially as described.

In testimony whereof I affix my signature in presence of two witnesses.

FRED CLARK.

Witnesses:
   CHESLEY M. JURNEY,
   CLAUDE V. BERKHEAD.